United States Patent
Wergen et al.

(10) Patent No.: US 6,580,414 B1
(45) Date of Patent: Jun. 17, 2003

(54) METHOD FOR TRANSFERRING CHARACTERS ESPECIALLY TO A COMPUTER AND AN INPUT DEVICE WHICH FUNCTIONS ACCORDING TO THIS METHOD

(76) Inventors: Gerhard Wergen, Parkstrasse 1, D-90513 Zirndorf (DE); Klaus Franz, Tuerkheimer Strasse 1, D-90455 Nurnberg (DE)

(*) Notice: Subject to any disclaimer, the term of this patent is extended or adjusted under 35 U.S.C. 154(b) by 0 days.

(21) Appl. No.: 09/581,850
(22) PCT Filed: Oct. 18, 1999
(86) PCT No.: PCT/EP99/07880
§ 371 (c)(1), (2), (4) Date: Aug. 8, 2000
(87) PCT Pub. No.: WO00/23870
PCT Pub. Date: Apr. 27, 2000

(30) Foreign Application Priority Data

Oct. 19, 1998 (DE) .......................................... 198 49 515

(51) Int. Cl.⁷ ................................................. G09G 5/00
(52) U.S. Cl. ................ 345/156; 345/161; 345/163; 345/168; 345/173; 345/772; 345/773; 200/5 R; 200/6 R; 200/8 R; 341/20; 341/21; 341/22
(58) Field of Search .......................... 345/161, 163, 345/168, 169, 170, 172, 173, 176, 762, 764, 772–773; 341/20, 21, 22; 200/5 R, 6 R, 8 R

(56) References Cited

U.S. PATENT DOCUMENTS

| | | | | |
|---|---|---|---|---|
| 4,769,517 A | * | 9/1988 | Swinney ..................... 200/6 A |
| 5,008,847 A | | 4/1991 | Lapeyre | |
| 5,184,315 A | * | 2/1993 | Lapeyre ..................... 708/145 |
| 5,473,325 A | | 12/1995 | McAlindon | |
| 5,543,818 A | | 8/1996 | Scott | |
| 5,661,476 A | * | 8/1997 | Wang et al. ..................... 341/22 |
| 5,805,167 A | * | 9/1998 | van Cruyningen .......... 345/808 |
| 5,949,325 A | * | 9/1999 | Devolpi ....................... 200/6 A |
| 6,016,142 A | * | 1/2000 | Chang et al. ................ 345/168 |
| 6,037,942 A | * | 3/2000 | Millington ................... 345/156 |
| 6,069,552 A | * | 5/2000 | Van Zeeland ............... 200/512 |
| 6,225,976 B1 | * | 5/2001 | Yates et al. ..................... 341/21 |
| 6,256,029 B1 | * | 7/2001 | Millington ................... 345/841 |
| 6,313,826 B1 | * | 11/2001 | Schrum et al. .............. 200/5 A |
| 6,380,498 B1 | * | 4/2002 | Chou ........................ 200/17 R |

FOREIGN PATENT DOCUMENTS

| | | |
|---|---|---|
| DE | 196 47 149 | 12/1997 |
| EP | 0 854 437 | 7/1998 |
| FR | 2 751 442 | 1/1998 |
| GB | 1 475 886 | 6/1977 |
| GB | 2 145 258 | 3/1985 |
| WO | WO96/38810 | 12/1996 |
| WO | WO99/46563 | 9/1999 |

* cited by examiner

Primary Examiner—Henry N. Tran
(74) Attorney, Agent, or Firm—Burns, Doane, Swecker & Mathis, LLP

(57) ABSTRACT

A personal computer for a handicapped person includes an input panel that is subdivided into a group of fields, with one of the fields designated as a central field for the group. Each field is, in turn, subdivided into nine elements (spaces) comprised of a neutral central element surrounded by eight output elements. Each of those eight output elements has an output character representing a respective output signal. A mark (cursor) is moved across the panel by a control stick that is manipulated by a user. The cursor is always initially located at the center element of the central field. In order to move the cursor to a desired output element, the user: (a) identifies the field in which the desired output character is located, (b) moves the cursor in a first direction to the central element of that identified field, and (c) moves the cursor by one space directly to the desired output element in a second direction oriented either orthogonally or diagonally to the first direction.

11 Claims, 2 Drawing Sheets

METHOD FOR TRANSFERRING CHARACTERS ESPECIALLY TO A COMPUTER AND AN INPUT DEVICE WHICH FUNCTIONS ACCORDING TO THIS METHOD

BACKGROUND

The invention relates to a method and an input device for enabling a handicapped person to input characters into a personal computer (see U.S. Pat. No. 5,008,847).

An input device with a joystick is found at times in special cases for the operation of manufacturing machines or of measuring apparatuses in lieu of the function of the four cursor keys used in the above-mentioned publication (also contained on current standard keyboards) to maneuver a mark on a screen in a particular field and then to activate the thereby indicated operation be means of an additional key ("ENTER"). Maneuvering on the screen is currently more common though by means of the so-called mouse through actuating its push-button switch to activate functions after reaching a particular field on the screen display. Thereby the conventional keyboard may be replaced, according to the generic publication of prior art, in that its character selection menu is shown on the computer that is to be activated and the respective character is activated with a mouse cursor for a character transfer to the computer (corresponding to a key stroke on the keyboard). But the exact positioning in a particular keyboard display cannot be "blind" as compared to manual direct keyboarding and it takes therefore too much time, apart from the frequency of errors based on inaccurate selection of the desired element at the rather small display on the screen. Besides, it is a disadvantage that such an input on the screen requires a software adjustment for each user program, whereas a keyboard may be connected to any PC as hardware that is independent in programming.

It is known from U.S. Pat. No. 5,543,818 to display the entire character selection menu in rows and to group together four characters of two subsequently following rows in a square field. With an operating device that is to be operated with two hands, there is selected one of the fields with one hand by means of cursor switches, and with the other hand there is selected one of its four characters in the chosen field for transfer to a computer. This character selection may again not be performed "blind" and it is not performed with sufficient speed even with the effort of a two-handed operation since no starting position can be defined for the two-step selection process.

That is also true for the display of the character selection menu in concentric dome sectors as shown in U.S. Pat. No. 5,473,325, whereby characters have to be selected by using both hands or by using a joystick with each hand to activate the transfer of the character that was so selected.

Instead, devices that may be manipulated in a blind manner have found use, as in the traditional and so far proven typewriter-type keyboards as well as in electric and electronic data input devices such as keyboards for teletype machines or for PC's. However, handicapped persons—such as the ones suffering from multiple sclerosis or spastic paralysis—have considerable problems, even with having all their limbs, with the exact selection and manipulation of the many closely-spaced keys on the keyboard—or even with the exact movement of a mouse cursor to a particular spot on the screen display. Even greater are these problems with persons who are paraplegic or amputees and who can make exact mechanical moves only with their lips and therefore can no longer operate a keyboard or a mouse of all things. On the other hand, it is to be very much striven for to offer those groups of people a life worth living by performing meaningful tasks.

OBJECTS AND SUMMARY OF THE INVENTION

This is the basis for a problematic nature in the present invention; this object of an exact and rapid selection of a character from a character selection menu is achieved according to the invention, not by lifting of the hand, stretching of the finger and making contact of a particular spot on a surface, or by difficult reproducible manual movement of a mouse cursor across a surface, but by an easier, controllable short sequence of laterally applied pressure—according to the characteristics statement in the two main claims—the traditional keyboard configuration is shown on an illuminated panel in such a manner (namely it is arranged in a grouped matrix) that principally at first, and within each of the groups, there occurs with only two direction-oriented hits against the control pin of a positioning element the selection and thereby the transfer of a specific character shown on the illuminated panel or the function switching command to a connected device for further processing.

Therefore there is within one field each function element adjacent to the only central element of this field. One central element is therefore surrounded by eight function elements at a maximum; or a field consisting of a maximum of nine elements, from which a maximum of eight fields surrounds its central element. In the same manner there is a group of fields with a maximum of nine fields from which a maximum of eight fields surround a central field. Furthermore, the panel may have a maximum of nine groups, from which a maximum of eight groups surround a central group.

Since not only each element, but also each field (and finally even each group) has multiple assigned meanings (as customary on typewriter-type keyboards by using the "Shift" key and also on the computer keyboard by using the "Alt" and AltGr" key) it is already sufficient for the reproduction of the computer keyboard (and additional control possibilities) a panel with two field groups, from which the one is a 3×1 field matrix and the other one is a 3×3 field matrix consisting of nine elements per field, respectively, as it is the case in the last-mentioned matrix with the usual multiple assignment of their alphanumeric and punctuation symbol elements and with the additional double assignment of its central field to control the cursor—as described below in more detail. There it will be discussed that switching is possible to a continuous "mouse" control (possibly to draw lines or for the selection of image elements) by the analog-type positioning element, subsequently realizing it with the "click" function via at least one additional push-button switch Hat is provided. Through the multi-function of an already provided push-button switch, rapid function-switching may be finally performed, which is parallel to the described two-step start-up possibility of the corresponding field element.

However, it is essential in the preferred basic embodiment that in case of an inoperative positioning element, one moves at first from the central element of the central field of the 3×3 field matrix to jump in the central element of another field in this group or into the central element of the central field of another group—which is caused by short, correspondingly oriented, lateral pressure applications against the control pin, which protrudes from the positioning element and which returns subsequently back to the neutral center position, and whereby it takes acceptance by correspondingly changing of illumination from the central element of the central field to the central element of the selected field. However, this causes no damage if the control pin is not released again as it is immediately disengaged into the next jump direction.

Then after this first exact input there occurs the selection of the character within the field that was jumped on in this manner by a second such exact application of force on the control pin, namely from the central element of this just released field in the panel. The jumped-on character—corresponding to the element reached by the second jump—is now automatically identified and the illuminated mark returns to its starting position, which means to the central element of the central field without making additional input operations necessary therefore Should the element, which was jumped-on in the second step, have no characters to be transferred but is to effect a function, then this function is triggered; or the illuminated mark jumps at first, still in the panel, into the central element of the field that is assigned to this function in order to hit and trigger from here a further selection for the already prepared function via a maximum of two additional input jumps.

In principle, there are necessary for the exact output possibly two successive exact inputs on the control pin, namely within the just reached field group, so that after some practice total PC manipulation may be performed not only in a rapid manner but also "blind"—and particularly now even by severely handicapped persons, as people having inevitably the greatest but uncontrolled physical strength (based on spasm or athetosis) or people with the lowest physical strength (possibly based on muscular dystrophy, muscular atrophy, or rheumatism) or people with permanent little mobility (based on deformation of limbs or paraplegia), or also people having uncontrollable trembling movements (as in Parkinson disease), whereas before all such individuals were totally excluded from performing such tasks. After education about the character distribution on the panel, manipulation is extremely simple since we are not dealing with a position-critical movement of a mark (as in mouse control), but we are dealing with a minimum of sequences (in the rule only two steps) of similar, hitting-type, limited and complete actions—entirely corresponding to the traditional movement sequence consisting of selection and pushing down on a key on the keyboard. This sequence in the form of a double, simple direction-selective lateral pressure with the body against the control pin, at first to jump on a selected field from the direction of a starting element and then to jump in the selected field for the selection of a character element itself, is easy and rapidly achieved and makes thereby possible, after some training, total "blind" typing (touch type) just like on a keyboard because of this simple movement sequence.

DESCRIPTION OF THE DRAWINGS

Reference is made to the following description of a preferred technical realization example of the invention. Accompanying drawings show the following.

DESCRIPTION OF A PREFERRED EMBODIMENT OF THE INVENTION

Figure 1:
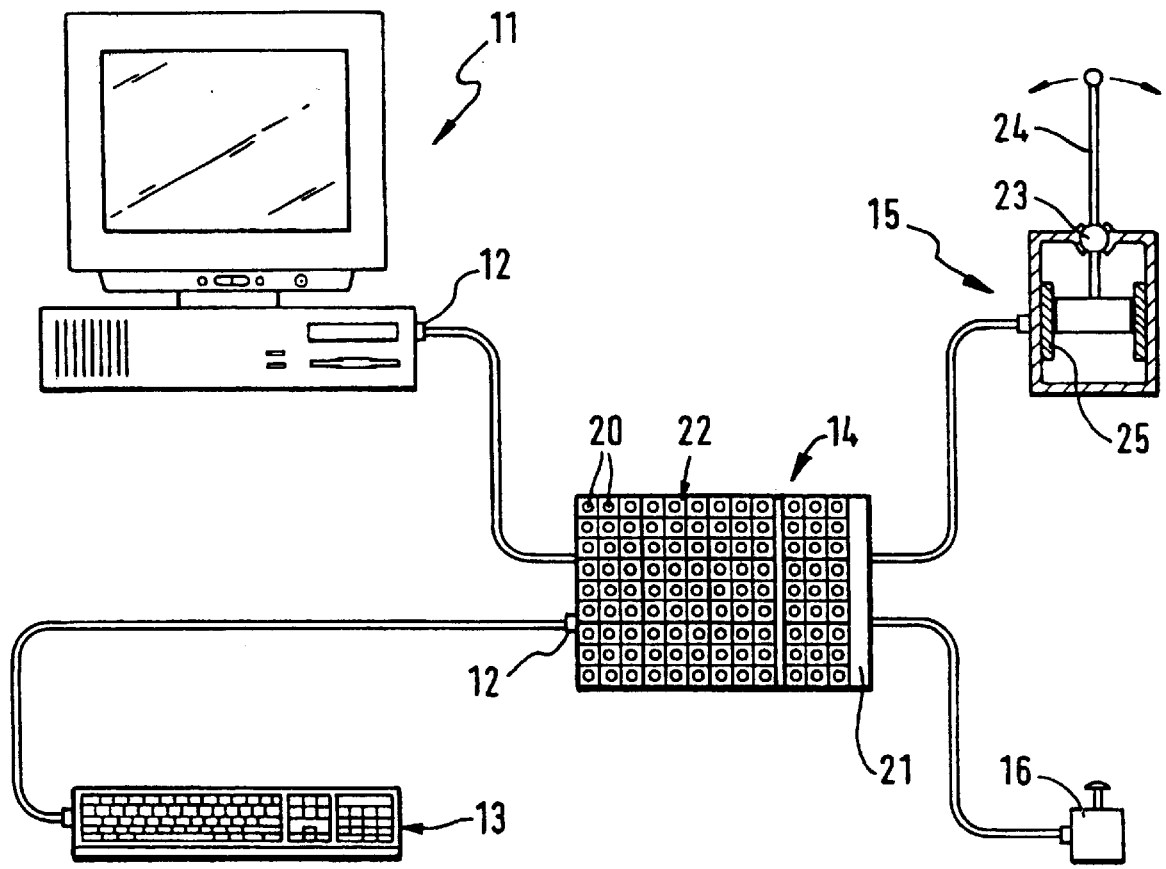
FIG. 1 shows the connection of a keyboard replacement to a computer designed according to the invention, consisting of an illuminated panel and a positioning element.

For manual input of alphanumeric character sequences (very general, including actuation of function keys), for example in a PC 11, there is connected in FIG. 1 at its keyboard inlet 12 a flat-constructed panel 14 according to the invention, instead of the usual keyboard 13, preferably not with an integrated but a separate positioning element 15 of the type of a joystick control device or the like. At least one additional push-button switch 16 may be integrated into the panel 14 or in the positioning element 15 or as illustrated, it may also be connected separately. A simultaneous connection of the traditional keyboard 13 to the computer is to a certain extent possible by looping through the panel 14.

Figure 2:
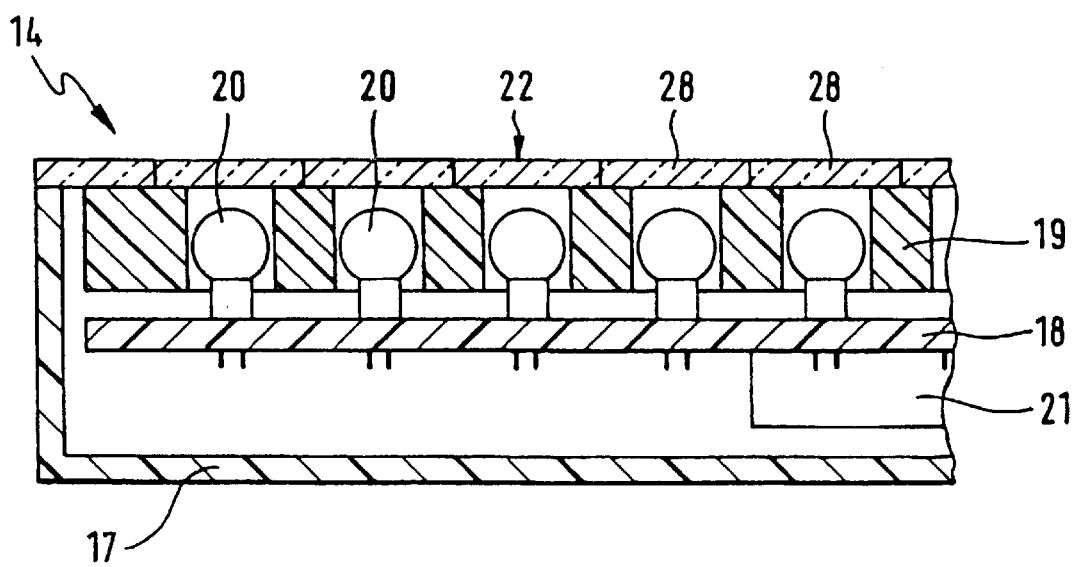
FIG. 2 shows in a cut-off cross-sectional view the configuration of the panel in FIG. 1.

The panel 14 consists of a flat housing 17, which surface area is preferably determined by the dimensions of the standard European PC card 18. On the card 18 (see FIG. 2) there is arranged within the housing 17 a grid consisting of miniature light bulbs (20), which are laterally shielded from one another by means of a thick, applied perforated template, preferably in the form of light-emitting diodes (LED).

Instead of the locally selective illuminated cover 22, which is provided with selectable characters (always meaning: including functions), an electro-optic display may also be used, possibly a passive liquid crystal display (LCD), or an active electro-luminescent display, in which the just selected field 27 and the therein jumped element 28 (also active) is distinguished by its brightness and/or (different) coloring relative to the respective surrounding. The grid made of light-emitting diodes in a perforated template 19 can be manufactured more economically, can be illuminated brighter locally, and may be adjusted quicker to changing requirements.

Such a logic array 21, preferably realized as microprocessor, serves—amongst other things—to inquire the present actuation of the positioning element 15 and to transfer this actuation to the control of a light bulb 20. When the grid coordinate of a light bulb 20 is assigned to an alphanumeric input value, which radiates (light) onto a translucent cover 22 via the perforated template 19 and through a hole thereof, and whereby said grid coordinate is visibly identified, then this individual value so-coded by the processor circuit 21 is transferred to the computer 11 and processed therein in such a manner as if this value were entered in the traditional way through the keyboard 13, while it is also generated graphically on the screen. The illustration of the light bulbs 20 in FIG. 1 is understood to be only symbolic; in reality the person viewing the cover 22 sees only the specific grid coordinate lit up which has just been selected bistable or unstable by means of the positioning element 15.

As positioning element 15 there can be basically used any contact-activated orienting device, thus also disengaging joysticks with a switching response characteristic. In view that the innovative keyboard replacement is to create an employment opportunity for persons with a handicap in motor function, as positioning element there is preferably used a practically pathless responding four-coordinate force transducer, as it is described in more detail in PCT WO 96/38810 in several embodiments as follows: A double-armed lever is mounted in a roller bearing 23 at a neutral equilibrium and said lever rests continuously against the pressure pad 25 opposite the protruding control pin 24, whereby the actual load on said pressure pad 25 is interpreted in the circuit 21 via voltage grading trigger circuits (Schmitt trigger) steady or unsteady through an amplifier. The control pin 24 may protrude from a table-shaped base for actuation by a person's extremities or said control pin may hang over the top of a base (DE 1 96 47 149); or the control pin 24 may be provided with at least one additional push-button switch 16 or mounted horizontal to be actuated with a person's mouth (EP 854 437 A).

Figure 3:
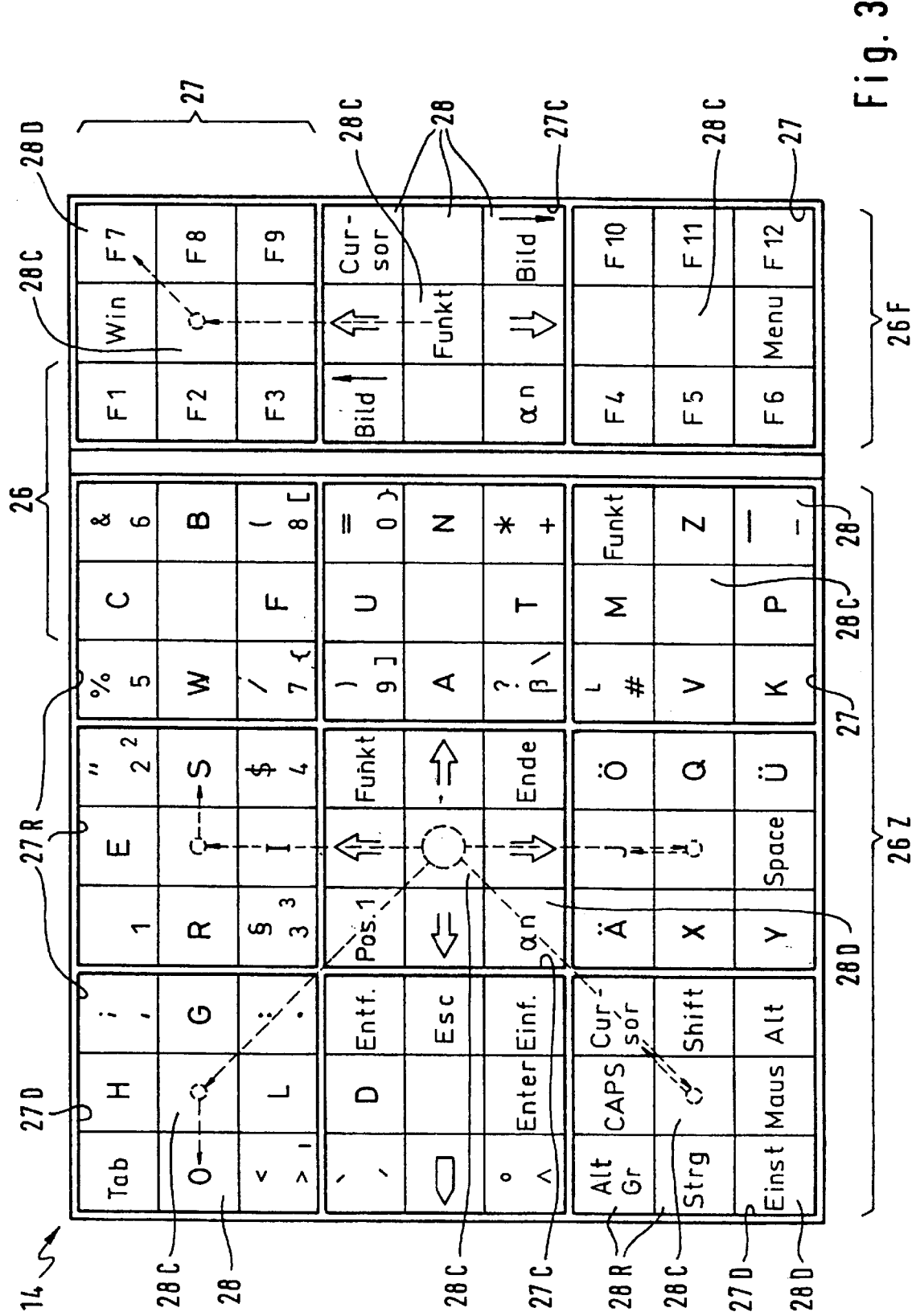
FIG. 3 shows in a nearly true scale a top view onto the field layout of the panel in FIG. 1 and also shows the sequence of various input examples by dotted illustrations.

The innovative keyboard replacement is designed in such a manner (as shown in FIG. 3) that practically the entire key arrangement of the conventional keyboard is pictured on the panel 14—without using additional background planes—in which the conventional key stroke is replaced by double actuation (lateral force effect) of the control pin 24. In contrast to the directionally not defined, free start-up of a specific coordinate on a graphically illustrated table with a cursor via a mouse or the like, the innovative solution makes possible, after learning the character positions, "blind" writing and thus rapid input even by persons who cannot operate a conventional keyboard because of a medical handicap.

As sketched in FIG. 3, the display on the panel 14 is divided into two groups 26, a square character group 26Z and a stretched-out function group 26F. Each group 26 consists in this embodiment example of several square fields 27 with nine elements 28 each.

In the function group 26F, the function elements of the conventional function keys F1 . . . F12 are arranged at the two outer rows, and in between, as illustrated, there are calls for Windows and for menu programs, page controls as well as transitions for cursor and alphanumeric input. The latter is performed on the standard operating surface. Here there is a central control field 27C surrounded by a ring of fields 27R—each around one neutral (meaningless) central element 28C—on which the alphanumeric character sets are distributed, combined like on the conventional keyboard, and distributed according to the degree in frequency of appearance in texts; and there are some function-switching processes (in the corner field or the diagonal field 27D and in the lower left corner in the illustration).

It will be appreciated that the expression "character" as used herein could also be referred to as an "output character" because it signifies a particular output signal that is to be supplied to the computer. Of the nine elements 28 defining each field 27, only the eight elements which surround the central element 28C contain output characters and thus could be called output elements. The central elements 28C, which do not possess output characters are thus called neutral elements.

In the start-up condition and in the acceptor idle state, and in cases when the positioning element 15 is temporarily unloaded, the central element 28C in the central field 27C is active, which means it is visually distinguishable from its surroundings by illumination from behind by means of a light bulb 20 (FIG. 2), its basic brightness or change in color. The lettering of the central field 27C is at the present irrelevant since the first actuation of the control pin 24 leads to the transition in the neutral center 28C of one of the surrounding ring fields 27R; thus any short pressure against the control pin 24 toward the front leads in the upper ring field 27R (to the letter "S" amongst others) or a short pressure toward the rear leads in the lower ring field 27R (to the letter "J" amongst others). The subsequently occurring actuating direction, which means each second actuating direction on the control pin 24 effects already the final selection of an element 28 of the central element 29C of the just reached ring field 27R, which also means it leads from the upper position to the right and to the illumination of the letter "S" or it leads from the lower position upward to the illumination of the letter "J". The coding and transfer of this specific character to the computer 11 (at simultaneous feedback of the input system to the central element 28C in the central field 27C) is caused by the processor-programmed input circuit 21 as soon as the second pressure applied externally on the control pin 24 drops again—at the latest, however, when the second pressure direction application on the control pin 24 has already exceeded the pre-determined time period.

The elements 28 in the corner fields 28D of the ring fields 27R can be reached in the same way only by double-input pressure direction whereby the control pin 24 is pushed, for example, at first diagonally to the left and forward from the central element 28C to the central field 27 in order to jump on the neutral central element 28C in the field 27R at the upper left; whereby a short pressure to the left initiates the input for the letter "O".

In the path-dependent actuation of the control pin 24 it is functional to provide a guide bar bracket, which allows only two input directions that are orthogonal to one another and two corresponding diagonal input directions from the neutral inoperative position or the center position. Such a mechanically channeled guide is not effective in the preferred pathless positioning element 15 to make allowances for handicapped persons; it would also not be practical since one would have to return first to the inoperative position for the change into the next jump direction. Instead it is advantageous to preset the device by inquiry of the sensors pressure pads 25) by means of the circuit 21, in which overlap area of simultaneous stress of two orthogonal pressure pads 25 further process the input no longer as either X or Y direction but as "diagonal". This is done to jump with the first actuation of the control pin 24 into the center (28C) of the desired field 27, which means from the center 28C of the central field 27C to the corner fields 27D of the ring fields 27R, and then again to select desired character elements that surround the center 28C of this field 27 with the second actuation, staring from the center 28C of the ring fields 27.

However, in case that the just desired diagonal direction has not been exactly reached during application of a load by the control pin 27 but an adjacent element 28 has been selected unintentionally, then this process does not have to be canceled by returning to the central element 28C; to a certain extent there is rather an intermediate step possible by which the next orthogonal actuation direction leads from the center of a row to the adjacent corner position, which means there is a corner field 27 to be jumped or a corner element 28D in said corner field 27 to be selected. Thus, one can move with a circular motion of the control pin 24, without returning to the central element 28C, along the circle of outer elements 28 of a field 27 surrounding the central position 28C and then stop at an element 28 for the output of a character.

The selection of the bistable-acting elements "AltGr, Alt, Control and Shift", which are contained in the lower left ring field 27D, has the result that said elements remain active until the selection of the next character element (and they are distinguishable from the others, for example, by blinking intensity modulation); the element "CAPS" remains active even to its next selection At one time, a separate program called on other tasks for the parametric adjustment of this positioning element 15 as especially for the control of (motorized) wheel chairs.

The selection of the also bistable-acting element "mouse", which is contained in the lower left ring field 27D, activates a mouse-cursor operating mode at which the sequence of the pressure direction change and the force of the pressure determine the movement direction and the speed of a mouse cursor on the screen of the computer 11. In this operating mode one can draw therefore by using the positioning element 15 or one can make a selection between Windows icons; whereby the transition is activated through the input-click of the push-button switch 16 (FIG. 1).

The selection of the bistable element "Cursor" switches the action and the optical characteristics of the central field 27C. This will now be visually distinguished from the surrounding ring fields 27R, for example by surface illumination or simply by light bulbs at its outer corner locations (not shown in the drawing), to show that now a jump no longer takes place into one of the surrounding fields 27 from the central element 28C. Rather the actuation of the control pin 24 effects now a step-by-step movement of the cursor on the screen of the computer 11, just like with the actuation of the four cursor keys of a regular keyboard, or the cursor jumps into a starting position or an end position.

The diagonal element or the corner element 28D at the lower left of the central field 27C cancels the bistable cursor operation and returns then to the above-mentioned normal operation of the input of alphanumeric characters.

A selection of the element "Function" (in cursor operation 28D at the upper right of the central field 27C, or in the alphanumeric operation 28D at the upper right of the field 27D, which is itself on the lower right) leads to the transition into the center of an additional group 26F. This group, just like the previously-viewed ones, may be realized by a central field 27C having the surrounding ring fields 27R. Said group may also be function-switchable, but it opens up additional input possibilities in such great numbers to a point not necessary at all in keyboard replacements. Therefore there are provided in the present embodiment example only the usual twelve PC function keys and the two page-scroll keys, as well as two alternative program calls ("Windows" and "Menu") and an element 28D each for the direct return into the cursor operation or the alphanumeric operation of the other group 26Z. The remaining elements 28 of the group 26F are free and are available for optional special functions.

The keyboard display on a panel 14 in FIG. 3 can be basically shown on a screen by being software-controlled and it may be integrated into the actual document to be created, then element selection for character input could be performed via a joystick that is connected to the PC game port. A disadvantage is, however, that then a software adjustment would be necessary specifically for each application. From an application-oriented view, the hardware-technical solution described above is more functional, which makes possible the use of the device in a simple exchange for the usual key board 13 that is connected to the computer 11 without additional interruptions in the presently installed operating or application program.

In any case, it is made possible through the invention for the most severely handicapped persons to perform a rapid, virtually "blind" input of characters in a computer in which its conventional keyboard 13 is replaced by a character display on a matrix-shaped subdivided panel 14 with illumination which jumps according to the actuating direction of the control pin 24. A maximum of eight character-input elements 28 are each grouped on said panel 14 which surround a central element 28C and form fields 27 of 3×3 elements 28. A maximum of eight such fields 27R form in turn group 26 of 3×3 fields 27, which surround a central field 28C. This arrangement makes possible to jump to the output character (as an executing function) principally in a sequence with only two directional hits that are orthogonal or diagonal to one another and which are applied against the positioning element 15 functioning in a preferably pathless manner, namely by first selecting from the neutral center 27C/28C of the fields (27) by using the first pressure direction, the neutral center 28 of the fields 27R and select there from its neutral center 28C with the second pressure direction an element 28 from the eight elements 28R that are surrounding said center 28C. With this call and the output of the last selected element 28 (character or function) the system jumps into the starting position for the next selection process, which means it jumps back on the central element 28C of the central field 27C. Generally spoken, an adjacent selection field is jumped on at first from a starting field in a pre-determined direction whereby the character output-element is then selected therein in the second input step.

What is claimed is:

1. A method for transferring characters utilizing an input device having a character selection menu which includes the characters displayed as elements on a display surface that is subdivided into a plurality of fields, and whereby the elements are selected by a mark on the display surface and said mark is moved by applying external pressure to a positioning element before the transfer of the thereby selected characters is initiated;

wherein the fields contain each a central element and there are arranged next to it additional elements, one of the fields designated as a central field beside which additional fields are arranged, the selection of a character occurring in a manner whereby the mark is moved, each time in a direction designated by the positioning element, at first in a first direction from the central element of the central field to a central element of an adjacent field and immediately after that in a second direction to an adjacent element on said field that is adjacent to the central element, whereby the transfer of said character is generated and assigned to this last reached element, and whereby the marking automatically jumps back into the central element of the central field, wherein the transfer of the last jumped-on character is initiated as soon as the pressure which is applied externally on the positioning element during movement in the second direction drops, or at the latest, when the movement of the pressure element in the second direction has exceeded a pre-determined time period.

2. A method according to claim 1, characterized in that only jump directions are allowed, which are orthogonal and diagonal to one another.

3. A method according to one of the claim 1, characterized in that the diagonal jump is created by a sequence of two inputs, which are orthogonal to one another.

4. A method according to claim 1, characterized in that, depending on the assignment of an outer element, one jumps from a central element of a field—instead of transfer of a character—into the central element of a field that is adjacent to this field or one jumps into the central element of the central field of this group of fields, or to an adjacent group of fields.

5. An input device having a positioning element and a circuit for transferring characters from a pre-determined character selection menu, whereby the character selection menu includes characters displayed as elements on a display surface that is subdivided into a plurality of fields, and whereby the elements are selected by a mark on the display surface and said mark is moved by applying external pressure to a positioning element before the transfer of the thereby selected characters is initiated; the fields contain each a central element and there are arranged next to it additional elements, one of the fields designated as a central field beside which additional fields are arranged, the selection of a character occurring in a manner whereby the mark may be moved, each time in the direction designated by the positioning element, at first in a first direction from the central element of the central field to a central element of an adjacent field and immediately after that in a second direction to an adjacent element on said field that is in turn adjacent to the central element, whereby the transfer of said character is generated and assigned to this last reached element, and whereby the marking automatically jumps back into the central element of the central field, the circuit effecting the transfer of the last jumped-on character as soon as the pressure which is applied externally on the positioning element during movement in the second direction drops; or at the latest, when the movement of the pressure element in the second direction has exceeded a pre-determined time period.

6. An input device according to claim 5, further including a circuit which is connected to the positioning element for converting only input directions on the positioning element which are orthogonal or diagonal to one another, to jumps into the possible adjacent elements or into the central element of the possible adjacent field in this direction.

7. An input device according to claim 6, characterized in that the circuit converts an unclear diagonal input on the positioning element into an orthogonal selection and allows an additional orthogonal input for the jump into the central element of a field bordering diagonal to the central field, or within a field in one of its diagonal elements.

8. An input device according to claim 5, characterized in that the circuit is arranged in an illuminated housing which displays the elements and the fields.

9. An input device according to claim 5, further including a keyboard connected to a keyboard inlet of the housing.

10. An input device having a positioning element and a circuit for transferring characters from a pre-determined character selection menu, whereby the character selection menu includes characters displayed as elements on a display surface that is subdivided into a plurality of fields, and whereby the elements are selected by a mark on the display surface and said mark is moved by applying external pressure to a positioning element before the transfer of the thereby selected characters is initiated; the fields contain each a central element and there are arranged next to it additional elements, one of the fields designated as a central field beside which additional fields are arranged, the selection of a character occurring in a manner whereby the mark may be moved, each time in the direction designated by the positioning element, at first in a first direction from the central element of the central field to a central element of an adjacent field and immediately after that in a second direction to an adjacent element on said field that is in turn adjacent to the central element, whereby the transfer of said character is generated and assigned to this last reached element, and whereby the marking automatically jumps back into the central element of the central field, wherein the character set of a conventional computer keyboard is displayed in a matrix-shaped group of 3×3 fields on which there are elements arranged around a central element, plus there is an additional matrix-shaped group of 3×1 fields for function keys.

11. An input device having a positioning element and a circuit for transferring characters from a pre-determined character selection menu, whereby the character selection menu includes characters displayed as elements on a display surface that is subdivided into a plurality of fields, and whereby the elements are selected by a mark on the display surface and said mark is moved by applying pressure to a positioning element before the transfer of the thereby selected characters is initiated; the fields contain each a neutral central element and there are arranged next to it additional output elements, one of the fields designated as a central field beside which additional fields are arranged, the selection of a character occurring in a manner whereby the mark may be moved, each time in the direction designated by the positioning element, at first in a first direction from the central element of the central field to a central element of an adjacent field and immediately after that in a second direction to an adjacent element on said field that is in turn adjacent to the central element, whereby the transfer of said character is generated and assigned to this last reached element, and whereby the marking automatically jumps back into the central element of the central field, wherein the character set of a conventional computer keyboard is displayed in a matrix-shaped group of 3×3 fields on which there are elements arranged around a central neutral element.

* * * * *